E. K. HOOD.
TALLY BOX.
APPLICATION FILED DEC. 4, 1906.
909,185.
Patented Jan. 12, 1909.
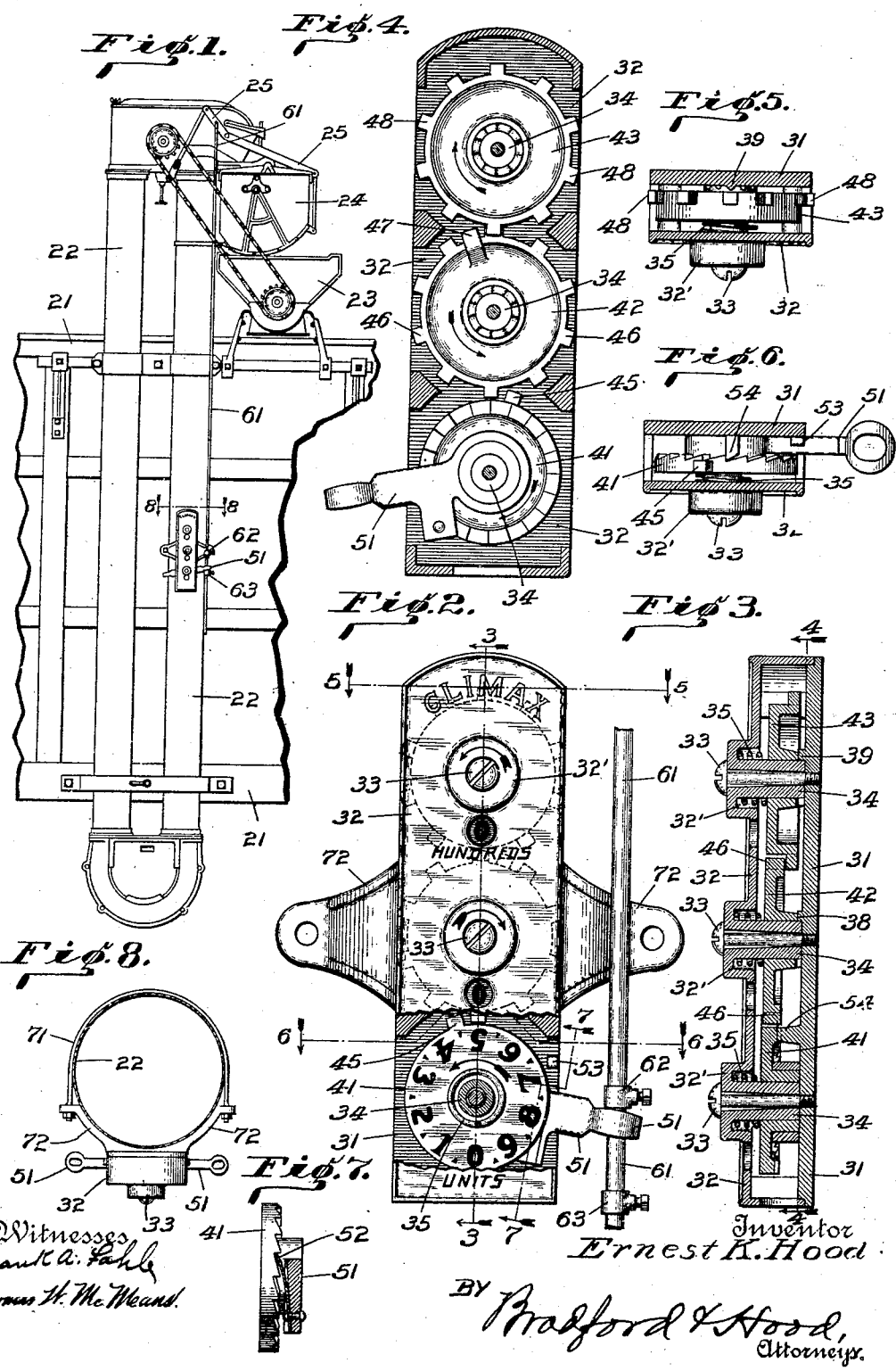
Witnesses
Frank A. Fahle
Thomas H. McWeans
Inventor
Ernest K. Hood
BY Bradford & Hood,
Attorneys.

UNITED STATES PATENT OFFICE.

ERNEST K. HOOD, OF INDIANAPOLIS, INDIANA, ASSIGNOR TO CHESTER BRADFORD, OF INDIANAPOLIS, INDIANA.

TALLY-BOX.

No. 909,185.  Specification of Letters Patent.  Patented Jan. 12, 1909.

Application filed December 4, 1906. Serial No. 346,303.

*To all whom it may concern:*

Be it known that I, ERNEST K. HOOD, a citizen of the United States, residing at Indianapolis, in the county of Marion and State of Indiana, have invented certain new and useful Improvements in Tally-Boxes, of which the following is a specification.

The object of my present invention is to produce an improved "tally" or counter. This is (of course) adapted to a variety of uses, but I have especially designed it for use with a grain elevator and weigher, such as is commonly attached to a threshing machine.

Referring to the accompanying drawings, which are made a part hereof, and on which similar reference characters refer to similar parts, Figure 1 is a side elevation of a grain elevator and weigher as it appears when mounted upon a threshing machine (of which a fragment is shown), said elevator and weigher being equipped with one of my improved counters or registers; Fig. 2 a front elevation of such a counter or register, on an enlarged scale, a portion of the front wall being broken away to show the parts beneath; Fig. 3, a central vertical sectional view of the same, at the point indicated by the dotted line 3 3 in Fig. 2; Fig. 4, an underside plan view of the counter wheels, in place, carried by the outer part or front wall of the casing, as seen when looking in the direction indicated by the arrows from the dotted lines 4 4 in Fig. 3; Figs. 5 and 6, horizontal sectional views as seen when looking downwardly from the dotted lines 5 5 and 6 6, respectively, in Fig. 2; Fig. 7, a detail sectional view showing the engagement of the operating pawl, as seen when looking in the direction indicated by the arrows from the dotted line 7 7 in Fig. 2, and Fig. 8, a top or plan view of the "tally" and the means by which it is attached to the elevator tube or leg, as seen when looking downwardly from the dotted line 8 8 in Fig. 1.

The separator 21, elevator 22, cross-conveyer 23, weigher 24, and their adjacent parts may be of any desired character, as my present invention relates wholly to the "tally box" or registering device, and means of attaching and operating same.

The frame or casing of my improved counter consists essentially of a bottom plate 31 and a front wall or top plate 32, said two parts being usually connected together by screws or bolts 33, as best shown in Fig. 3. One of these walls or plates (they are shown on the front plate 32) has projections 34 upon which the counter wheels are mounted, and which serve as shafts for said wheels. Said projections extend to and are in contact with the plate 31 when the parts are assembled. These projections 34 extend from the bottoms of annular recesses formed within extending hub-like portions 32' on the front plate 32, and within said recesses I place coiled springs 35 which urge the tally wheels toward the plate 31. If the standards 34 were on the bottom plate 31 separate keepers (of washer-like form) would be desirable. The front plate 32 is also provided with sight-orifices, through which the numerals on the faces of the counter wheels can be seen, as is best shown in Fig. 2. The direction of rotation of said wheels is indicated by curved arrows on Figs. 2 and 4. Three counter wheels are shown in this illustration, which is the usual number in devices of this character, and permits a tallying or registering of numbers less than 1,000. The wheel 41 is the "units" wheel; the wheel 42 is the "tens" wheel, and the wheel 43 is the "hundreds" wheel.

The hub of the units wheel constitutes a bearing for an operating lever 51, which carries a pawl 52, preferably formed of spring steel, (see especially Fig. 7), which engages with ratchet teeth formed on the underside of the rim of said units wheel 41. There are twenty of these ratchet teeth, for a purpose which will presently be explained, and consequently it takes twenty strokes of the lever to effect a complete revolution of said wheel. A limiting stop, as 53, should be provided upon an adjacent part to aid in setting the operating lever so that it shall not move the wheel 41 too far at a stroke. A projection 54 on the plate 31 extends up and engages with these same ratchet teeth, and thus holds the wheel 41 to each of the positions to which it is moved by the lever and pawl. The spring 35 holds the tally wheel down and maintains this engagement.

Upon the rim of the wheel 41 is a tooth 45, and upon the adjacent rim of the wheel 42 are ten corresponding teeth 46. As the tooth 45 passes any one of the teeth 46 it operates to turn the wheel 42 one-tenth of a revolution.

The wheel 42 has, in a different plane, a single tooth 47, and the wheel 43 has, in the same plane as the tooth 47, ten corresponding teeth 48. Each time the single tooth 47 passes one of the teeth 48, it operates to turn the tally wheel 43 one-tenth of a revolution.

The lower ends of the hubs of the wheels 42 and 43 have each ten notches. At points immediately alongside the parts 34, and adapted to register with these notches, there are single projections 38 and 39 on the plate 31. These projections engage with the notches, and hold the counter wheels to an operative position. The springs 35 hold the wheels into engagement with these projections. The engagement, however, is a yielding one, and I am therefore enabled to set this "tally" back to zero, promptly and easily, at any time, without taking the structure apart. I do this by simply grasping the rims or edges of the counter wheels with the fingers, and revolving them in the direction indicated by the arrows until the cipher shows through the sight-orifices in the wall or plate 32. The yielding of the springs 35 permits this; and the sides of the structure are left open at the points opposite the edges of the tally wheels for the purpose. This counter is operated, in the use for which it has principally been designed, by means of a rod 61 which passes through a suitable hole in the end of the lever 51 and has strikes 62 and 63 secured thereto on opposite sides of said lever. As the stroke of the rod 61 is usually greater than the desired movement of the lever 51 these strikes are positioned a little distance apart, accordingly. The rod 61 is operated from a vibrating part of the weigher mechanism—usually the weigher-bucket-gate operating-lever 25, as shown in Fig. 1. In some cases it may be desirable to have the rod 61 positioned on the opposite side of the tally from that shown in Figs. 1 and 2. This can be provided for by making the lever 51 a double-armed lever, as shown in Figs. 1 and 8. Ordinarily, however, a single-armed lever, such as is shown in Figs. 2, 4 and 6, is all that is necessary.

Each of the counter wheels has inscribed on its surface near its rim, the ten numerals, 1 to 0 inclusive, as is customary in registering devices. On the "units" wheel 41 I also preferably place indicating marks at the points half way between the numerals. As previously stated, there are twenty of the ratchet teeth by means of which this wheel is revolved. In machines of the character in question (elevators and weighers for threshing machines) the bucket of the weigher (24) is customarily made of a size which contains half a bushel. Obviously it is desirable that the register should indicate bushels. As the mechanism which operates the counter operates with the discharge of each half-bushel, of course the initial or "units" wheel is given movements accordingly. That is, it is given one-twentieth instead of one-tenth of a revolution at each movement of the rod 61, which is actuated by the weigher mechanism, as described. The points between the numerals on this wheel, therefore, indicate half bushels. That is to say: when one of said points is visible through the sight-opening, the preceding number displayed should be read with the addition of one-half. By this counter, therefore, which is adapted to be moved by each movement of the weigher mechanism, the half-bushels, as well as the bushels, can be kept account of.

The counter in use is designed to be secured to one leg or tube of the elevator. It can be secured thereto at any point desired, so as to bring it into convenient position for observation. The means which I have employed to secure this counter in place are very simple; and consist of a clip or U-bolt 71 which passes around the tube or elevator leg, as best shown in Fig. 8, and engages with brackets or wings 72 on the base or main part 31 of the tally-box casing. These brackets or wings form a saddle which fits nicely on to the tube or elevator leg; and, as will be readily understood, the counter structure, as a whole, can be positioned at any desired point longitudinally thereof, or in any desired circumferential relation thereto. Of course the operating rod 61 may be of any length, and the strikes 62 can be positioned thereon at any desired point.

Having thus fully described my said invention, what I claim as new, and desire to secure by Letters Patent, is:—

1. The combination, in a counter, of a suitable casing, counter-wheels, shaft-like members contained within said casing to carry the counter wheels, the counter wheels and adjacent portions of the structure being provided with interengaging notches and projections, whereby the counter wheels are held to moved position, and springs whereby the counter wheels are yieldingly held into engagement with the adjacent portion of the structure.

2. The combination, in a counter, of a suitable casing provided with projections forming shafts for the counter wheels, the counter wheels, other projections adapted to engage with notches in adjacent portions of said wheels, and springs whereby the counter wheels are held into such engagement, the casing being provided with openings adjacent to the rims of the wheels whereby said wheels may be grasped and moved to a desired position by hand without disassembling the structure.

3. The combination, in a counter, of a suitable casing, counter wheels mounted therein, said counter wheels and adjacent portions of the structure being provided with interengaging surfaces, means for rotating the counter wheels, and means operating transversely of the plane of rotation for holding the interengaging surfaces normally into engagement.

4. The combination, in a counter, of a suitable casing, counter wheels mounted therein, means for rotating the counter wheels, said counter wheels being also movable transversely of the plane of rotation, and the said counter wheels and adjacent parts being provided with interengaging surfaces, the interengaging parts being spaced to normally hold the counter wheels to the predetermined positions, but capable of permitting movement of said wheels as the registering progresses.

5. The combination, with an elevator, of a tally operable from the elevator mechanism and formed to fit upon one side of the elevator leg and having laterally-extending ears formed on the body thereof, and a U-bolt embracing the other side of said leg and having its ends extending through the ears on the tally body for securing said tally to said elevator leg.

6. The combination, in an elevator and weigher, of a tally secured to a leg of the elevator and provided with an operating arm, a rod connecting both to the weighing mechanism and to said tally-operating arm, and means for adjusting the attachment of said connecting rod.

7. The combination, in an elevator and weigher, of a tally secured to a leg of the elevator and provided with an operating arm having a hole therein, a rod connected to the weighing mechanism at one end and passing through the hole in said tally-operating arm, and bearing collars on opposite sides of said arm.

8. The combination, in an elevator and weigher, of a tally secured to a leg of the elevator and provided with an operating arm having a hole therein, a rod connected to the weighing mechanism at one end and passing through the hole in said tally-operating arm, and bearing collars on opposite sides of said arm, said collars being adjustable longitudinally of said rod and said tally being adjustable longitudinally of the elevator leg, whereby said tally may be positioned at such point on the elevator as desired without impairing the operating means thereof.

In witness whereof, I have hereunto set my hand and seal at Indianapolis, Indiana, this first day of December, A. D. one thousand nine hundred and six.

ERNEST K. HOOD. [L. S.]

Witnesses:
CHESTER BRADFORD.
THOMAS W. McMEANS.